United States Patent [19]
Mueller

[11] Patent Number: 5,988,573
[45] Date of Patent: Nov. 23, 1999

[54] STAND FOR ARTICLE

[75] Inventor: Thomas D. Mueller, Imperial, Mo.

[73] Assignee: American Trading and Production Corporation, Baltimore, Md.

[21] Appl. No.: 08/949,661

[22] Filed: Oct. 14, 1997

[51] Int. Cl.$^6$ ................................................. F16M 11/02
[52] U.S. Cl. ........................................ 248/177.1; 248/161
[58] Field of Search .............................. 248/177.1, 161, 248/125.1, 125.8, 188.5, 405, 413

[56] References Cited

U.S. PATENT DOCUMENTS

| | | | |
|---|---|---|---|
| 2,532,173 | 11/1950 | Lewis | 248/413 |
| 2,536,503 | 1/1951 | Jones | 248/413 |
| 2,854,303 | 9/1958 | McInnis | 248/161 |
| 5,385,323 | 1/1995 | Garelick | 248/161 |

Primary Examiner—Leslie A. Braun
Assistant Examiner—Willie Berry, Jr.
Attorney, Agent, or Firm—Cohn, Powell & Hind

[57] ABSTRACT

Telescopic stands for articles such as microphones used by entertainers, hospital intravenous packets and cameras are widely used. Some telescoping microphone and hospital intravenous stands require many turns of a ring in order to hold the microphone, for instance, in place. An entertainer needs to be able to almost instantly adjust the height of his microphone. The stand herein includes a height adjusting means which operates more quickly. It includes telescopically related outer and inner members, and also means for readily locking the upper inner member within the lower outer member.

10 Claims, 4 Drawing Sheets

5,988,573

STAND FOR ARTICLE

BACKGROUND OF THE INVENTION

This invention, relates generally to stands for articles and more particularly to collapsible stands for supporting microphones, hospital intravenous (i.v.) packets, cameras and similar articles.

Stands for articles such as these are widely used and certain features are especially desirable. One such stand is the subject of commonly-owned prior patent U.S. Pat. No. 5,340,066, and it refers to U.S. Pat. No. 4,671,479. These two patents are incorporated herein by reference. Among the features of such stands are stability, portability and lightness of weight. Stability can be achieved by providing a heavy circular base member as seen in hospitals, but such stands do not lend themselves to a desirable lightweight compact unit. Herein lightness is achieved by fabricating the stand out of a plastic. Compactness can be achieved by the use of removable or foldable legs.

One of the disadvantages of many stands for articles is the time which is consumed in adjusting the height of the article holding unit. In hospital situations and when entertainers are on stage time is precious. Some telescoping microphone and iv stands, such as those having sleeves within a tightening ring, require many turns of the ring in order to hold the microphone, for instance, in place. An entertainer needs to be able to almost instantly adjust the height of his microphone.

One prior stand is known and described herein which includes a clamping collar having a threaded clamping assembly. However, the clamping assembly includes loose parts which are easily displaced and lost.

The present stand overcomes the above and other disadvantages in a manner not revealed in the known prior art.

SUMMARY OF THE INVENTION

It is an object of this invention to provide a support stand for stage performers and hospitals that includes a height adjusting means which operates much more quickly than prior art stands. The stand requires only a few turns of a clamping screw, yet it still lends itself to being manufactured by plastic molding techniques when desired. Importantly, this stand has essentially no parts which can readily become loose and are easily lost.

This support stand for holding an article in an elevated position includes a lower outer tubular support member and an upper inner member. The upper inner member is provided with means for receiving the article being held. It is movably disposed within the lower outer tubular support member in a telescopic fit to permit height adjustment of the stand. A feature of this invention is that it includes means for readily locking the upper inner in place within a clamping collar. The clamping collar is adapted to surround the upper member. An abutment cam is held within this clamping collar. One of its surfaces is attached to an inside surface the clamping collar. A radial bore passes through the collar opposite the clamping cam. A clamping bolt within the bore then urges the abutment cam in clamping engagement with the upper inner tubular member to lock it in place.

It is an aspect of this invention to provide that the abutment cam is formed as an inside part of the clamping collar so that it is an integral part thereof. In one embodiment, it has a bottom portion attached to the inside of the collar.

It is another aspect of this invention to provide that the base member provides a clamping collar for the lower member similar to that which the clamping collar provides for the upper member with respect to the attached abutment cam.

This telescopic stand is provided with a clamping collar which is easy to manufacture, use and adjust and is very effective for its intended purpose.

DESCRIPTION OF A PREFERRED EMBODIMENT

Figure 1:
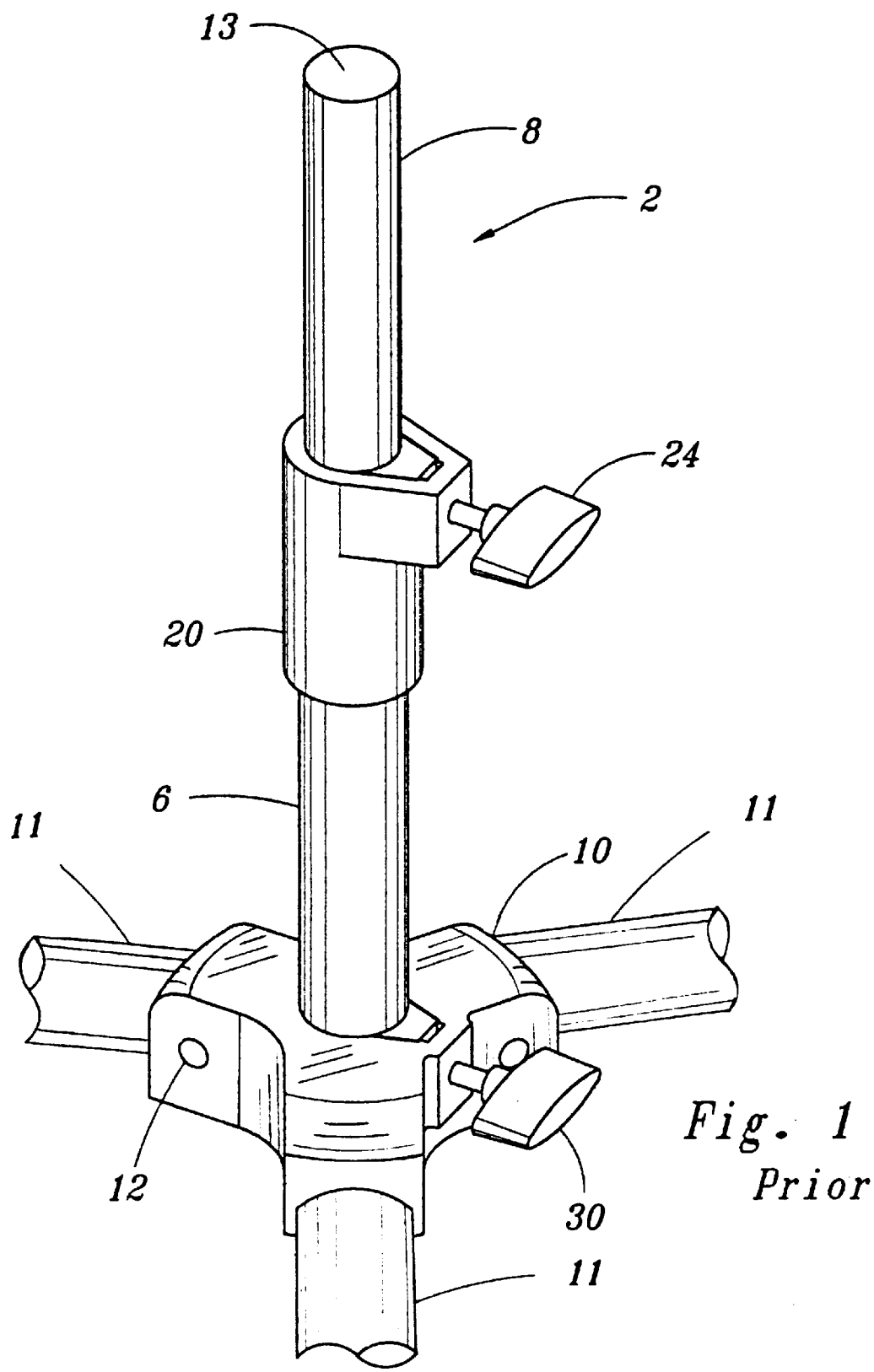
FIG. 1 is a perspective views of a prior art device.
Figure 2:
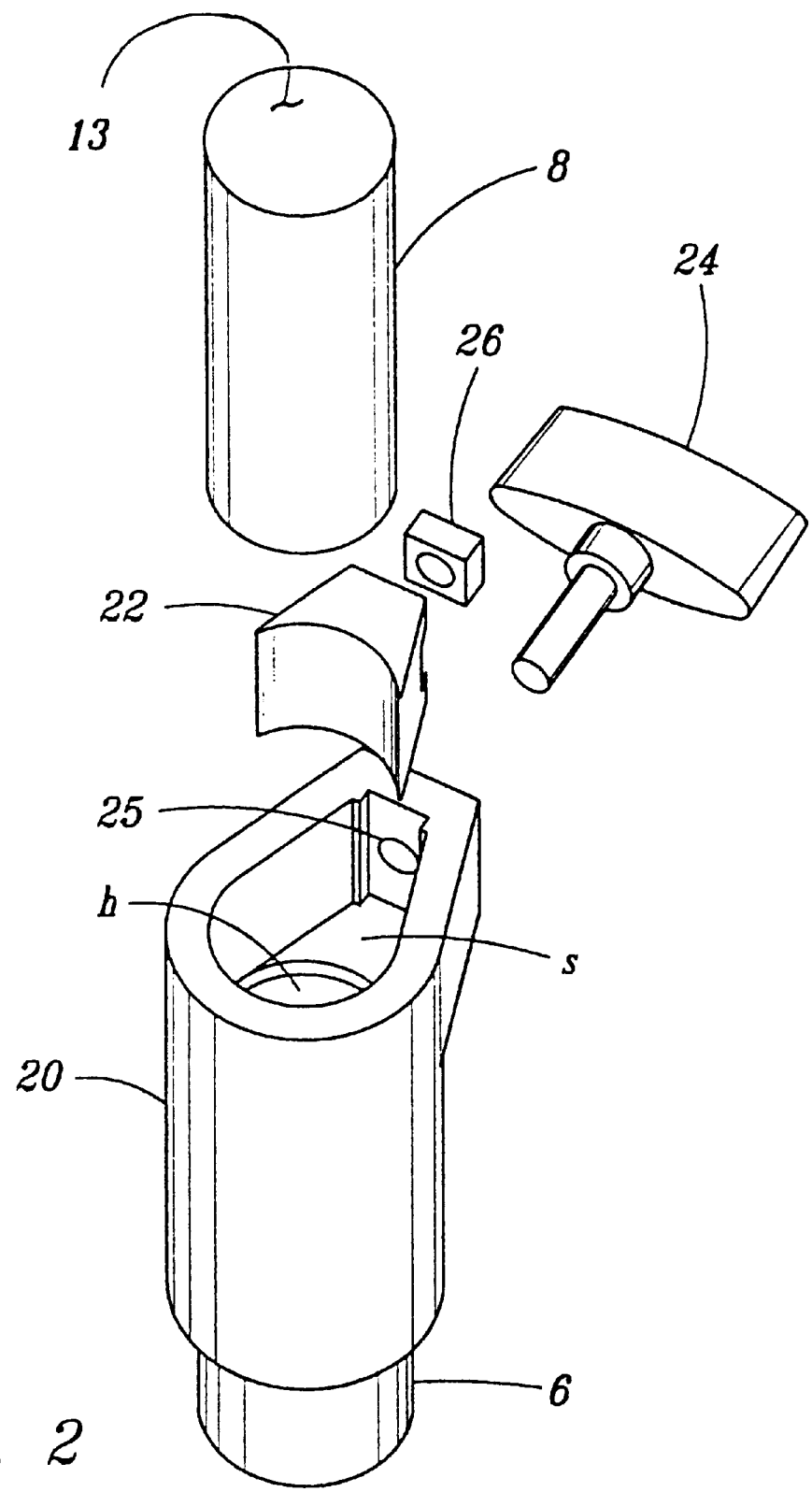
FIG. 2 is an exploded view illustrating the parts making up the prior art device.
Figure 3:
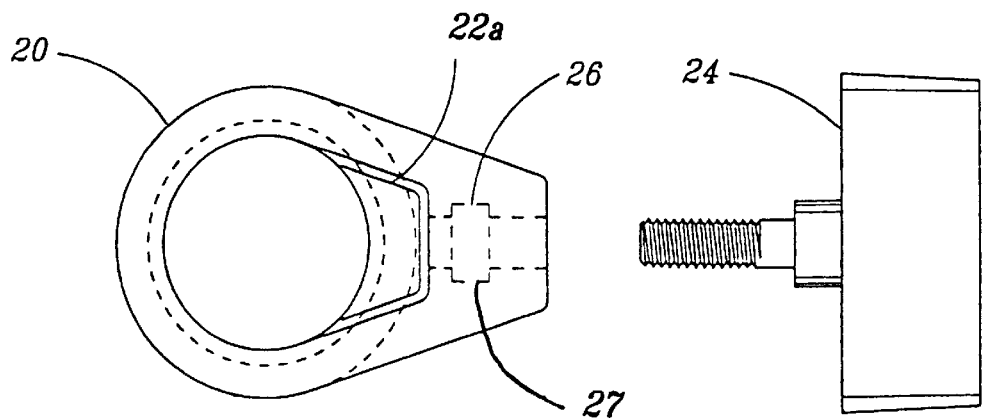
FIG. 3 is a two-part top view of the locking mechanism of this invention.
Figure 4:
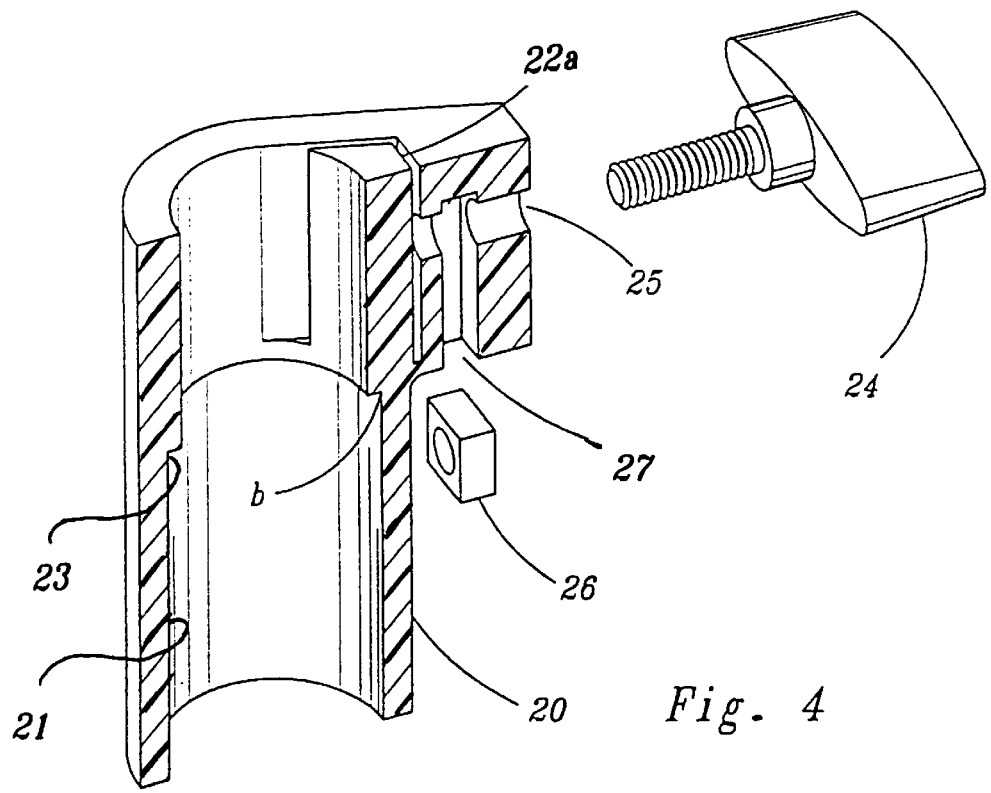
FIG. 4 is a view, partly in cross section illustrating the features of the locking mechanism of the invention.
Figure 5:
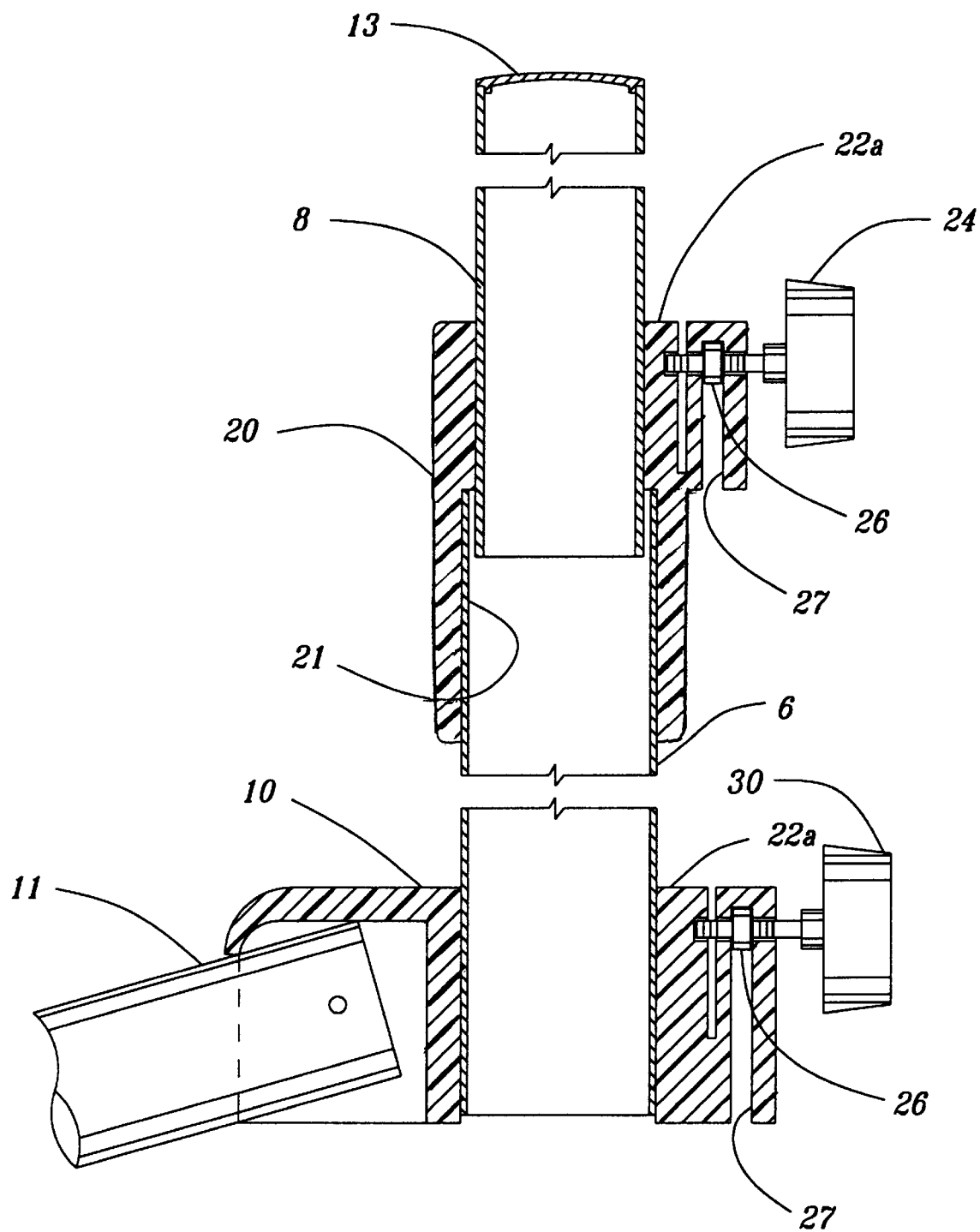
FIG. 5 is a fragmentary longitudinal cross-sectional view of the telescopic stand.

Referring now by reference numerals to the drawings it will be understood that FIGS. 1 and 2 show a prior art stand while FIGS. 3–5 show the stand of the invention herein. The two stands are similar except for the clamping arrangement. Accordingly, similar parts will be given the same reference numeral while related parts will include a suffix "a".

Referring first to FIGS. 1 and 2, the support stand 2 herein includes an elongated lower tubular member 6 and an upper member 8 which may be tubular or solid but will be shown as tubular herein. Lower tubular member 6 is the stand supporting member. It is provided with a base member 10 adapted to receive legs 11 which can be held in place by bolts through holes 12. As illustrated in FIG. 1, the first, upper tubular member 8 is movably or slidably inserted in the second, lower outer tubular member 6 in a telescopic fashion so that it moves in and out of the outer tubular member for height adjustment. The top portion of upper tubular member 8 below the cap 13 will be provided with means, not shown, to hold a microphone, i.v. bag or camera, it being understood that such hooks and clamps, as well as the legs of the stand, are common and not a part of this invention. Both stands may be fabricated of metal tubes and plastic connecting parts such as nylon. The prior art stand depicted in FIGS. 1 and 2 and the stand which is the subject of this invention and depicted in FIGS. 3–5 include a clamping collar 20.

The separate parts of the prior art clamping means are shown in FIG. 2. It is the clamping means which is improved herein. Illustrated in FIG. 2 are outer cylindrical tubular member 6, inner cylindrical tubular member 8, clamping collar 20, abutment cam 22, clamping bolt 24, and nut 26. It can be seen that abutment cam 22 is in the shape of a block having one side contoured with a curvature corresponding to the outside curvature of inner cylindrical tubular member 8. This member 22 is adapted to fit in space s in the first or upper portion of the collar and to be forced against cylindrical member 8 by clamping bolt 24, which passes through a bore 25 in clamping collar 20, and is assisted by nut 26 as will be described.

FIGS. 1 and 2 provide a quickly locking stand for supporting articles. This stand, unfortunately, was not totally satisfactory. Hence it has been labeled "prior art" herein. It was found that if the upper inner cylindrical member 8 is removed, either by choice or by accident, the loose abutment cam 22 fell into the bore or hole h in lower outer tubular support member 6. If an entertainer, for example, accidentally completely withdrew the inner member 8 the result could be disastrous. Even if the stand is being disassembled to be moved the result is undesirable because loose parts such as the abutment cam 22 and even the nut 26 can easily be lost.

In the improved stand it has been found that since abutment cam 22 a moves only hundredths of inches to a locking position against inner tubular member 8 the abutment cam 22a need not be detached, that is it need not be a separate item as is the case with the prior art stand. One side, or its bottom, may be attached to, that is integral with, the inside surface of clamping collar 20. This is illustrated particularly in FIGS. 4 and 5. It is to be noted that abutment cam 22a along its bottom b is integral with the surface of the clamping collar. As will be clear from FIG. 3, when the upper portion of abutment cam is being urged forward by clamping bolt 24 it will flex inwardly, pivotally, about its attached bottom portion, exerting its cam action against the upper cylindrical tubular member 8. Referring to FIG. 4, it will be seen that clamping bolt is forced forward because nut 26 is held in a rectangular slot or recess 27.

It can be appreciated that the realization that the abutment cam can have one of its surfaces attached, rendered the instant device illustrated in FIGS. 3–5 a significant improvement over the prior device illustrated in FIG. 1. Having been given the teachings of this invention ramifications and variations will occur to those skilled in the art. Thus, as shown in FIG. 5, base 10, which provides a clamping collar, can be attached to outer tubular member 6 by the same cam action conferred by clamping collar 20. Such a clamping collar can be formed within base 10 with the abutment cam 22a being urged forward by bolt 30 as illustrated in FIG. 5. In addition the legs 11 attached to base member 10 can carry casters (not shown).

As another variation, it is to be understood that clamping collar 20 may be a unitary part of lower support member 6. Alternatively, it can be manufactured separately and clamped or otherwise affixed onto the outer tubular support member. In the embodiment shown, the passage 21 is tapered and is slightly greater in diameter at the lower end to facilitate entry of the second, lower stand portion 6 so that when the stand portion 6 is received in the second, or lower portion of the collar 20 and engages the abutment 23 it is firmly held in place by friction. In addition, whereas it is desirable, abutment cam 22a need not be provided with a curved surface conforming to that of the inner cylinder. It can have a flat surface, and might even be coated with a material increasing friction. Further, although as stated, the sides may be easier to cut, it may be found desirable to cut the bottom and one side of the abutment cam and have it flex out from a side into clamping engagement with the cylindrical member. As a different modification, if the clamping collar 20 is made of metal rather than plastic it may be desired to provide the bottom or side of the abutment cam with a film hinge or other spring hinge to hold the abutment cam 22a in place. Moreover, while it is not commonly done, parts 6 and 8 can be reversed, with the outer larger tubular member being the upper member with the clamping collar at its bottom. Such modifications, then, are deemed to be within the scope of this invention.

I claim:

1. A support stand for holding an article in an elevated position, the stand including a lower outer tubular support member and an upper inner member, the lower outer tubular member being provided with a base member, the upper inner member being movably disposed within the lower outer tubular support member in a telescopic relation with an end above the lower outer tubular member, said end being provided with means for receiving the article being held, an improvement comprising a damping collar adapted to surround the upper inner member, an abutment cam disposed within the clamping collar with one of its surfaces attached in a one piece unitary manner to the clamping collar, a radial bore passing through the collar opposite the abutment cam, a clamping bolt within the bore adapted to urge the abutment cam in clamping engagement with the upper inner member.

2. The support stand of claim 1 wherein the abutment cam is formed as an inside part of the clamping collar so that it is an integral part thereof.

3. The support stand of claim 2 wherein the abutment cam has a portion attached to the inside of the collar.

4. The support stand of claim 2 wherein the abutment cam has a bottom portion attached to the inside of the collar.

5. The support stand of claim 1 including a base member and attachment means fixing it on the bottom of the outer tubular support member, the base member providing a clamping collar adapted to surround a bottom portion of the lower outer tubular member, an abutment cam attached along a surface to the clamping collar, a radial bore passing through the collar opposite the clamping cam, a clamping bolt within the bore adapted to urge the clamping cam in clamping engagement with the tubular support member.

6. A support stand comprising a base member, a tubular support member, and attachment means for fixing the support member onto the base member, the base member including a clamping collar adapted to surround a bottom portion of the support member, an abutment cam attached along a surface of the clamping collar, a radial bore passing through the collar opposite the clamping cam, a clamping bolt within the bore adapted to urge the clamping cam in clamping engagement with the tubular support member.

7. A clamping collar for attaching telescopically related first and second members together, the collar comprising a first portion adapted to receive a first member in sliding relation, the clamping collar being adapted to surround the first member, an abutment cam disposed within the clamping collar with one of its surfaces attached to the clamping collar, the attachment permitting movement of said cam relative to said collar, the radial bore passing through the collar opposite the abutment cam, a clamping bolt within the bore adapted to urge the abutment cam in clamping engagement with the first member; and a second portion adapted to receive the second member in friction relation therewithin.

8. The clamping collar of claim 7 wherein the clamping collar includes a recess adapted to receive a nut accepting the clamping bolt in threaded relation.

9. A clamping collar for attaching telescopically related first and second members together, the collar comprising a first portion adapted to receive the first member in sliding relation, the clamping collar being adapted to surround the first member, an abutment cam disposed within the clamping collar and attached to the clamping collar by having at least a portion one piece unitarily formed with the clamping collar, the attachment permitting movement of said cam relative to said collar, a radial bore passing through the collar opposite the abutment cam, a clamping bolt within the bore adapted to urge the abutment cam in clamping engagement with the first member; and a second portion adapted to receive and hold the second member therewithin.

10. The clamping collar of claim 9 wherein the abutment cam includes a bottom portion unitarily formed with the clamping collar and a rear face spaced from said clamping collar.

* * * * *